US007535953B2

(12) United States Patent
Nomura et al.

(10) Patent No.: US 7,535,953 B2
(45) Date of Patent: May 19, 2009

(54) TIME INFORMATION TRANSMITTER-RECEIVER, AND TIME INFORMATION TRANSMISSION-RECEPTION INTEGRATED CIRCUIT

(75) Inventors: Keiichi Nomura, Fussa (JP); Kaoru Someya, Kiyose (JP)

(73) Assignee: Casio Computer Co., Ltd., Tokyo (JP)

( * ) Notice: Subject to any disclaimer, the term of this patent is extended or adjusted under 35 U.S.C. 154(b) by 620 days.

(21) Appl. No.: 11/003,722

(22) Filed: Dec. 3, 2004

(65) Prior Publication Data
US 2005/0141600 A1 Jun. 30, 2005

(30) Foreign Application Priority Data
Dec. 26, 2003 (JP) ............................. 2003-433651

(51) Int. Cl.
*H04B 3/36* (2006.01)
(52) U.S. Cl. ........................ 375/211; 375/135; 375/136; 375/226; 375/215; 375/213; 375/329; 375/327
(58) Field of Classification Search ................. 375/211, 375/135, 136, 226, 203, 329, 327, 215, 229, 375/227
See application file for complete search history.

(56) References Cited

U.S. PATENT DOCUMENTS

| 4,019,140 | A | | 4/1977 | Swerdlow | |
|---|---|---|---|---|---|
| 5,309,162 | A | * | 5/1994 | Uematsu et al. | 342/372 |
| 6,219,302 | B1 | * | 4/2001 | Tanoguchi et al. | 368/47 |
| 6,288,977 | B1 | * | 9/2001 | Yoshida et al. | 368/47 |
| 6,404,775 | B1 | * | 6/2002 | Leslie et al. | 370/466 |
| 6,459,657 | B1 | * | 10/2002 | Takada et al. | 368/46 |
| 6,973,121 | B1 | * | 12/2005 | Eberlein et al. | 375/211 |
| 2004/0198300 | A1 | | 10/2004 | Someya | |
| 2005/0101255 | A1 | | 5/2005 | Someya | |
| 2007/0032212 | A1 | | 2/2007 | Someya | |

FOREIGN PATENT DOCUMENTS

| EP | 1 531 559 A2 | 5/2005 |
|---|---|---|
| JP | 2000-075064 A | 3/2000 |
| JP | 2000-235091 A | 8/2000 |

OTHER PUBLICATIONS

European Search Report dated Mar. 28, 2008, issued in a counterpart European Application.

* cited by examiner

*Primary Examiner*—Shuwang Liu
*Assistant Examiner*—Kabir A Timory
(74) *Attorney, Agent, or Firm*—Frishauf, Holtz, Goodman & Chick, P.C.

(57) ABSTRACT

A time information transmission-reception integrated circuit includes: a reception control circuit for detecting a signal obtained by receiving and amplifying an external radio wave, and generating a clock data signal, based on a carrier signal the phase of which is synchronized with the signal; and a transmission control circuit for generating an amplitude modulation signal obtained by modulating the amplitude of the carrier signal by the transmission time code, by a modulator, and transmitting a relaying radio wave from an antenna, the phase of the relaying radio wave synchronized with the phase of the external radio wave, by correcting the phase shift of the amplitude modulation signal by a phase shifter. Thereby, the phase shift between the external radio wave and the relaying radio wave is cancelled.

4 Claims, 8 Drawing Sheets

TIME INFORMATION TRANSMITTER-RECEIVER, AND TIME INFORMATION TRANSMISSION-RECEPTION INTEGRATED CIRCUIT

CROSS-REFERENCE TO RELATED APPLICATIONS

This application is based upon and claims the benefit of priority from the prior Japanese Patent Application No. 2003-433651, filed on Dec. 26, 2003, and the entire contents of which are incorporated herein by reference.

BACKGROUND OF THE INVENTION

1. Field of the Invention

The present invention relates to a time information transmitter-receiver and a time information transmission-reception integrated circuit for transmitting and receiving a signal including time information.

2. Description of Related Art

A standard radio wave including time information, that is, a time code is sent in each country (for example, Germany, England, Switzerland, Japan or the like). In Japan, long wave standard radio waves the frequencies of which are 40 kHz and 60 kHz respectively are sent from two transmitting stations in Fukushima and Saga. The time code included in the standard radio wave is sent by the frame the cycle of which is 60 seconds, for every occasion when the place of minute of the exact time is updated, that is, for every 1 minute.

In late years, a so-called wave clock for receiving a standard radio wave including such the time code to correct the current time data by the standard radio wave has been put to practical use. The wave clock receives the standard radio wave via a built-in antenna for every predetermined time. Further, the wave clock amplifies and modulates the received standard radio wave and decodes the time code. Thereby, the wave clock corrects the current time.

When this kind of wave clock is placed in a room, it is often impossible to receive the standard radio wave according to the installation location, for example, in a steel framed house or a basement. Accordingly, a time information transmitter-receiver such as a repeater for receiving the standard radio wave, and transmitting a relaying radio wave by modulating the time code of the received standard radio wave by a predetermined carrier wave, in order to reduce the limitation of the installation location for the wave clock, has been known. The wave clock receives the relaying radio wave transmitted from the repeater, when the reception circumstance for receiving the standard radio wave is not well. Thereby, the wave clock can certainly perform the time correction without limitation of the installation location.

The time information transmitter-receiver such as the repeater receives an external radio wave such as the standard radio wave or the relaying radio wave transmitted from another repeater, and transmits the relaying radio wave obtained by modulating the amplitude of a predetermined carrier wave by the time code. In the repeater, the frequency of the carrier wave at the occasion of the generation of the relaying radio wave to be transmitted is often the same as the frequency of the received external radio wave. In this case, the phase shift is generated between the relaying radio wave to be transmitted and the received external radio wave, by a filter or the like that the repeater comprises.

Therefore, in the wave clock for receiving the relaying radio wave transmitted from the repeater, the synthesized signal that the external radio wave and the relaying radio wave the phases of which are shifted to each other are superposed on each other. That is, when the carrier wave of the external radio wave is defined as "A sin ωt" and the phase shift of the relaying radio wave with respect to the external radio wave is defined as φ, the carrier wave of the relaying radio wave is given as "B sin (ωt+φ)". Therefore, the received radio wave received by the wave clock is the signal given by the following formula (1)

$$A\sin\omega t + B\sin(\omega t + \phi) = \sqrt{A^2 + B^2 + 2B\cos\phi} \sin(\omega t + B) \quad (1)$$

$$\text{wherein, } \beta = \tan\frac{B\sin\phi}{A + B\cos\phi}$$

That is, according to the above formula (1), the amplitude of the synthesized signal is decreased because of the phase shift φ of the relaying radio wave with respect to the external radio wave. Accordingly, the problem that there is possibility for deteriorating the receiver sensitivity of the wave clock all the more, has occurred.

SUMMARY OF THE INVENTION

The present invention provides a time information transmitter-receiver and a time information transmission-reception integrated circuit for transmitting a signal including time information comprising the same phase and the same frequency as a signal including received time information. Thereby, a wave clock can certainly detect the time information.

PREFERRED EMBODIMENTS OF THE INVENTION

Hereinafter, the best mode for implementing the present invention will be described with reference to the drawings. Incidentally, in the followings, the case where the present invention is applied to a repeater which is a kind of a time information transmitter-receiver is described. However, the application of the present invention is not limited to this case.

<Configuration of Repeater>

Figure 1:
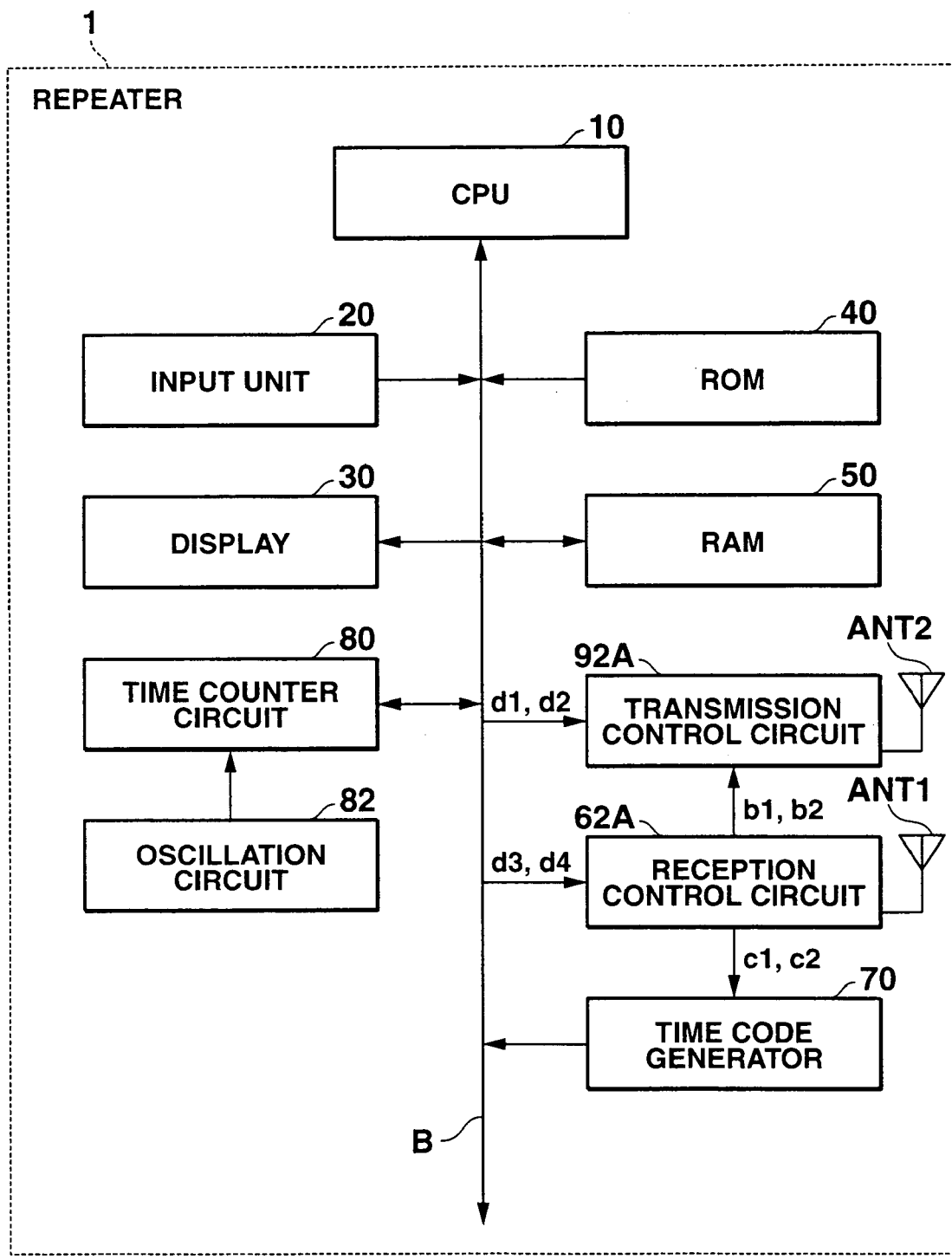
FIG. 1 is a diagram showing an internal configuration of a repeater in embodiments of the present invention.

FIG. 1 is a block diagram showing an inside configuration of a repeater 1 in the first embodiment. According to FIG. 1, the repeater 1 comprises a CPU (Central Processing Unit) 10 (i.e., the time transmission generation section or circuit), an input unit 20, a display 30, a ROM (Read Only Memory) 40, a RAM (Random Access Memory) 50, a reception control circuit 62A, an antenna ANT1 for the reception for receiving an external radio wave, a time code generator 70, a time counter circuit 80, an oscillation circuit 82, a transmission control circuit 92A, and an antenna ANT2 for the transmission for transmitting a relaying radio wave. Further, each part other than the antennas ANT1 and ANT2 and the oscillation circuit 82 is connected by a bus B, and the oscillation circuit 82 is connected to the time counter circuit 80.

The CPU 10 reads the program stored in the ROM 40 according to a predetermined timing or an operation signal inputted from the input unit 20 to develop the program into the RAM 50. Further, the CPU 10 performs instructions, data transfer or the like to each part of the repeater 1 based on the program. To put it concretely, the CPU 10 controls the reception control circuit 62A for every predetermined time to perform reception processing of the external radio wave, and corrects the current time data counted by the time counter circuit 80 based on the standard time code inputted from the time code generator 70. Further, the CPU 10 generates a transmission time code based on the current time data counted by the time counter circuit 80 or the standard time code generated by the time code generator 70. And then, the CPU controls the transmission control circuit 92A to perform the transmission processing of the relaying radio wave including the transmission time code. Hereupon, the "external radio wave" means the relaying radio wave having the same frequency as the long wave standard radio wave sent from another repeater or the like, in addition to the long wave standard radio wave transmitted from the transmitting station.

The input unit 20 comprises switches and the like for performing various functions of the repeater 1, and outputs operation signals corresponding to the switches to the CPU 10 when the switches are operated. The display 30 comprises a small liquid crystal display and the like, and performs digital display of current time based on the display signal inputted from the CPU 10.

The ROM 40 stores a system program and an application program related to the repeater 1, a program and data for realizing the present embodiment, and the like. The RAM 50 is used as the working area of the CPU 10, and temporarily stores the program read from the ROM 40, the data processed by the CPU 10, and the like.

The reception control circuit 62A performs, for example, the reception processing of the external radio wave including the time information for every predetermined time. The reception control circuit 62A cuts unnecessary frequency components from the radio signal received by the antenna ANT1 to take the frequency signal. Further, the reception control circuit 62A converts the frequency signal into a corresponding electric signal to output it to the time code generator 70.

The time code generator 70 converts the electric signal inputted from a reception control circuit 62A into a digital signal. Further, the time code generator 70 generates a standard time code (time information) comprising the data necessary for clock functions such as a standard time (clock time) code, a multiplication cord, a day of the week code or the like, and outputs the standard time code to the CPU 10.

The time counter circuit 80 counts the signal inputted from the oscillation circuit 82 to count the current time, and outputs the current time data to the CPU 10. This current time data is corrected by the CPU 10. The oscillation circuit 82 is the circuit for always outputting a clock signal having a constant frequency.

The transmission control circuit 92A performs the transmission processing of the relaying radio wave including the transmission time code based on the current time data counted by the time counter circuit 80 or the standard time code generated by the time code generator 70. The transmission control circuit 92A modulates the amplitude of a predetermined carrier wave by the transmission time code generated by the CPU 10. Further, the transmission control circuit 92A transmits the carrier wave from the antenna ANT2, as the relaying radio wave.

Two embodiments applied to the repeater 1 constructed as above will be described below in order.

First Embodiment

First, a first embodiment will be described.
In the first embodiment, the straight system is used for the reception control circuit 62A.

<Configuration>

Figure 2:
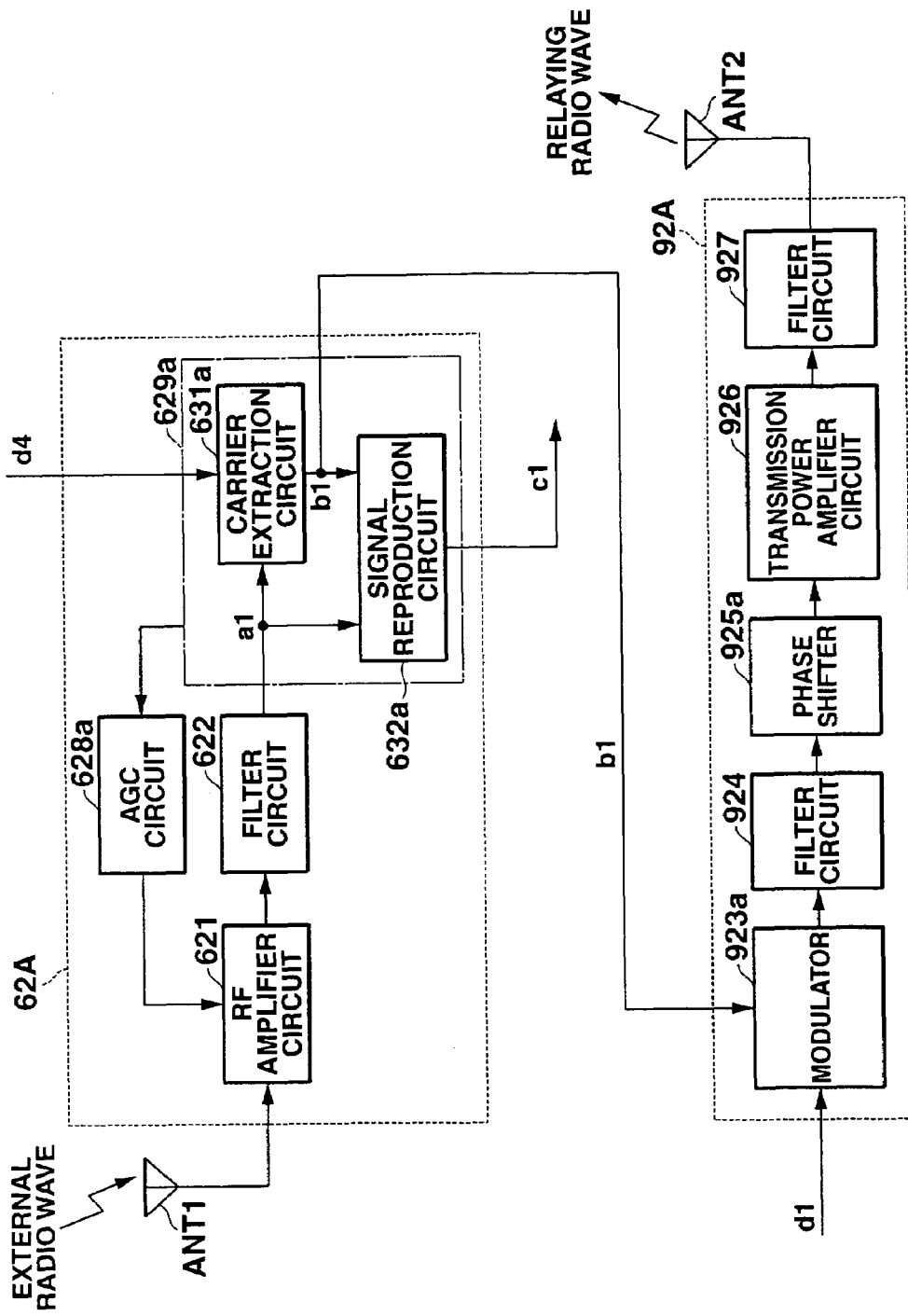
FIG. 2 is a diagram showing an internal configuration of a reception control circuit and a transmission control circuit of a repeater in a first embodiment of the present invention.

FIG. 2 is a block diagram showing the circuit configurations of the reception control circuit 62A and the transmission control circuit 92A of the repeater 1 in the first embodiment. In the first embodiment, the reception control circuit of the straight system is used as the reception control circuit 62A.

According to FIG. 2, the reception control circuit 62A comprises an integrated circuit comprising a RF amplifier circuit 621, a filter circuit 622, an AGC circuit 628a and a detection circuit 629a, and the antenna ANT1.

The antenna ANT1 can receive an external radio wave having a predetermined frequency, and comprises, for example, a bar antenna. The external radio wave received by the antenna ANT1 is converted into an electric signal, and outputted.

The RF amplifier circuit 621 amplifies or damps the electric signal inputted from the antenna ANT1, by the amplification degree corresponding to a gain control signal inputted from the AGC circuit 628a, and outputs it.

The filter circuit 622 comprises a band pass filter and the like. The filter circuit 622 outputs the signal inputted from the RF amplifier circuit 621, as a signal a1, while allowing the passage of frequency components of the signal within a predetermined range the center of which is the received frequency of the external radio wave, and blocking frequency components outside of the predetermined range.

The AGC circuit 628a outputs a control signal for adjusting the amplification degree of the RF amplifier circuit 621, according to the strength of the level of the signal a1 outputted from the filter circuit 622 and inputted via the detection circuit 629a.

The detection circuit 629a comprises a carrier extraction circuit 631a and a signal reproduction circuit 632a, and detects the signal a1 inputted from the filter circuit 622 to output a detection signal as a clock data signal c1. The clock data signal c1 outputted from the detection circuit 629a is inputted to the time code generator 70, and the standard time code is generated. The generated standard time code is inputted to the CPU 10, and used for various processing such as the correction of the current time data.

The carrier extraction circuit 631a comprises a PLL circuit and the like, and generates a carrier signal b1 having the same frequency and the same phase as the signal a1 inputted from the filter circuit 622 to output it.

Figure 3:
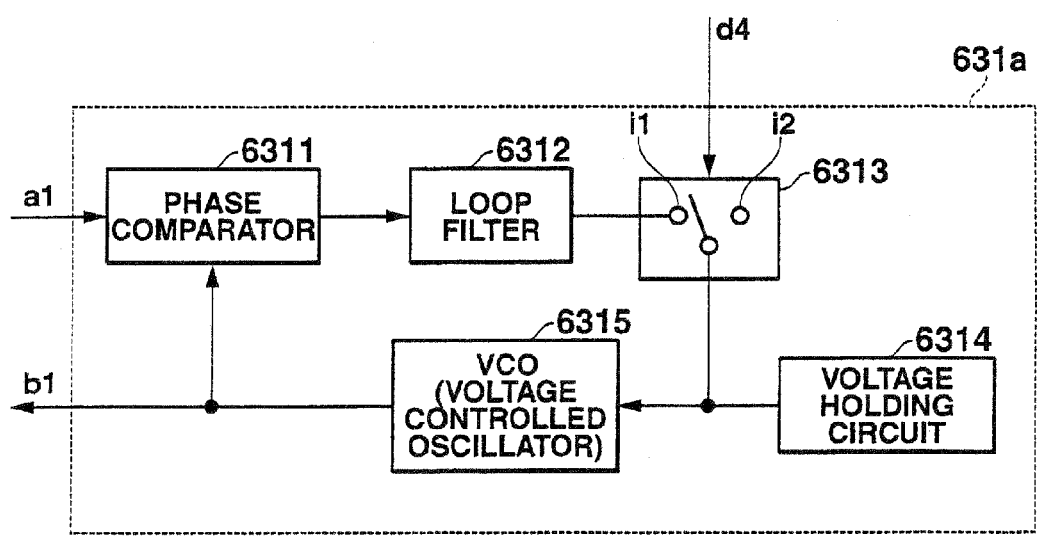
FIG. 3 is a diagram showing a circuit configuration of a carrier extraction circuit in the first embodiment of the present invention.

The detail circuit configuration of the carrier extraction circuit 631a is shown in FIG. 3. According to FIG. 3, the carrier extraction circuit 631a comprises a phase comparator 6311, a loop filter 6312, a switch circuit 6313, a voltage holding circuit 6314, and a VCO (Voltage Controlled Oscillator) 6315.

The phase comparator 6311 compares the phase of the signal a1 inputted from the filter circuit 622 with the signal b1 inputted from the VCO 6315. Further the phase comparator 6311 generates a signal (pulse signal) corresponding to the phase difference between the signals a1 and b1, and outputs it.

The loop filter 6312 comprises a LPF and the like. The loop filter 6312 blocks the high frequency components of the signal inputted from the phase comparator 6311, and outputs the smoothed (integrated) signal.

The switch circuit 6313 switches between the connections of terminals i1 and i2 according to a transmission-reception switch signal d4 inputted from the CPU 10. To put it concretely, when the transmission-reception switch signal d4 is switched to the reception side, the switch circuit 6313 is turned on by connecting the terminal i1. Further, when the transmission-reception switch signal d4 is switched to the transmission side, the switch circuit 6313 is turned off by connecting the terminal i2.

The voltage holding circuit 6314 comprises a condenser and the like. The voltage holding circuit 6314 holds the signal voltage level of an input signal during the input of the input signal. In addition, when the input has been disconnected, the voltage holding circuit 6314 keeps on holding the signal voltage level of the input signal just before the disconnection. That is, while the switch circuit 6313 is turned on, the voltage holding circuit 6314 holds the signal voltage level of the signal inputted from the loop filter 6312. Further, when the switch circuit has been turned off, the voltage holding circuit 6314 keeps on holding the signal voltage level of the signal which has been inputted from the loop filter 6312 just before the turning off.

When the switch circuit 6313 is turned on, the signal voltage level of the signal outputted from the loop filter 6312 is inputted as a control voltage. Further, when the switch circuit 6313 is turned off, the voltage held by the voltage holding circuit 6314 is inputted as the control voltage. And then, the VCO 6315 outputs an oscillation signal having a predetermined frequency the phase of which has been adjusted according to the inputted control voltage, as the carrier signal b1.

Therefore, while the transmission-reception switch signal d4 is switched to the reception side to receive the external radio wave, the carrier extraction circuit 631a outputs the carrier signal b1 the phase of which is synchronized with that of the signal a1 based on the received external radio wave.

Further, while the transmission-reception switch signal d4 is switched to the transmission side not to receive the external radio wave, the carrier extraction circuit 631a outputs the carrier signal b1 the phase of which is synchronized with that of the signal a1 based on the external radio wave which has been received just before the end of the reception of the external radio wave.

Further, in FIG. 2, the signal reproduction circuit 632a detects the signal a1 inputted from the filter circuit 622 based on the carrier signal b1 inputted from the carrier extraction circuit 631a, and extracts the time data. And then, the signal reproduction circuit 632a outputs the detection signal comprising the extracted time data, to the time code generator 70, as the clock data signal c1.

The transmission control circuit 92A comprises an integrated circuit comprising a modulator 923a, filter circuits 924 and 927, a phase shifter 925a and a transmission-power amplifier circuit 926, and an antenna ANT2.

The carrier signal b1 outputted from the carrier extraction circuit 631a and a transmission time code d1 outputted from the CPU 10 are inputted to the modulator 923a. Further, the modulator 923a generates an amplitude modulation signal which is obtained by modulating the amplitude of the inputted carrier signal b1 by the transmission time code d1.

The filter circuit 924 comprises a band pass filter and the like. The filter circuit 924 outputs the signal inputted from the modulator 923a, while allowing the passage of frequency components of the signal within a predetermined range the center of which is the transmitted frequency of the relaying radio wave, and blocking frequency components outside of the predetermined range.

The phase shifter 925a advances or delays the phase of the signal inputted from the filter circuit 924 by a predetermined amount to shift the phase, and outputs the signal.

The transmission power amplifier circuit 926 amplifies the electric power of the signal inputted from the phase shifter 925a, and outputs it.

The filter circuit 927 comprises a band pass filter and the like. The filter circuit 927 outputs the signal inputted from the transmission power amplifier circuit 926, while allowing the passage of frequency components of the signal within a predetermined range the center of which is the transmitted frequency, and blocking frequency components outside of the predetermined range. The signal outputted from the filter circuit 927 is transmitted from the antenna ANT2, as the relaying radio wave.

Hereinafter, the phase shift of the signal by the phase shifter 925a will be described.

Figure 4:
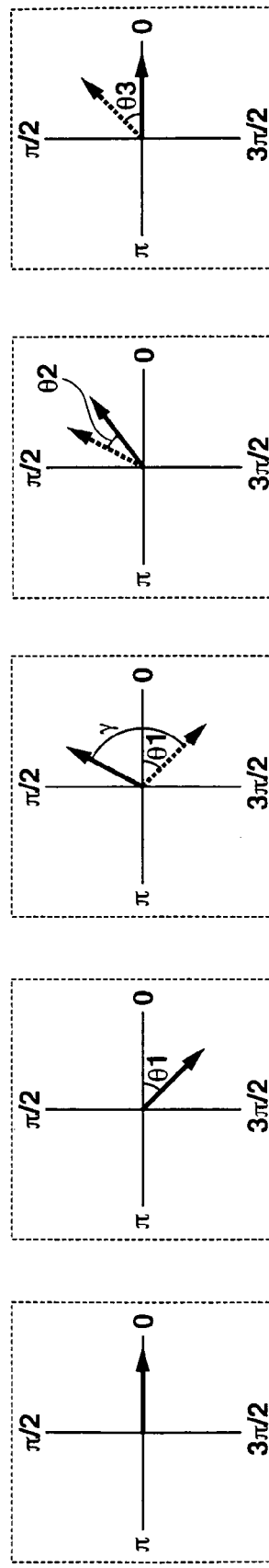
FIG. 4A is a diagram showing a phase of a signal (external radio wave) received by an antenna in the first embodiment of the present invention.
FIG. 4B is a diagram showing a phase shift of a signal outputted from a filter circuit in the first embodiment of the present invention.
FIG. 4C is a diagram showing a phase shift of a signal outputted from a phase shifter in the first embodiment of the present invention.
FIG. 4D is a diagram showing a phase shift of a signal outputted from a transmission power amplifier circuit in the first embodiment of the present invention.
FIG. 4E is a diagram showing a phase shift of a relaying radio wave outputted from the filter circuit and transmitted from the antenna in the first embodiment of the present invention.

FIG. 4A to FIG. 4E are diagrams conceptualizing the phase shifts of the external radio wave received by the antenna ANT1 and each of signals in the reception control circuit 92A. FIG. 4A shows the phase of the signal (external radio wave) received by the antenna ANT1, FIG. 4B shows the phase shift of the signal outputted from the filter circuit 924, FIG. 4C shows the phase shift of the signal outputted from the phase shifter 925a, FIG. 4D shows the phase shift of the signal outputted from the transmission power amplifier circuit 926, and FIG. 4E shows the phase shift of the signal (relaying radio wave) outputted from the filter circuit 927 and transmitted from the antenna ANT2. Each of the phase shifts of FIG. 4B to FIG. 4E is shown by a vector, as the relative phase where the phase of the external radio wave of FIG. 4A is set to "0".

According to FIG. 4B, the signal outputted from the filter circuit 924 passes the filter that the reception control circuit 62A comprises or the filter circuit 924. Mainly for this reason, the phase of the signal outputted from the filter circuit 924 is delayed by θ1, with respect to the phase of the external radio wave.

When the phase shifter 925a advances the phase of the inputted signal by γ, the phase of the signal outputted from the phase shifter 925a is advanced by γ, with respect to the phase of the signal outputted from the filter circuit 924, as shown in FIG. 4C.

The signal outputted from the transmission power amplifier circuit 926 passes the transmission power amplifier circuit 926. For this reason, the phase of the signal outputted from the transmission power amplifier circuit 926 is delayed by θ2, with respect to the phase of the signal outputted from the phase shifter 925a, as shown in FIG. 4D.

The signal outputted from the filter circuit 927 and transmitted from the antenna ANT2 passes the filter circuit 927. For this reason, the phase of the signal outputted from the filter circuit 927 and transmitted from the antenna ANT2 is delayed by θ3, with respect to the phase of the signal outputted from the transmission amplifier circuit 926, as shown in FIG. 4E.

That is, the phase of the relaying radio wave transmitted from the antenna ANT2 is delayed by "θ1+θ2−γ+θ3", with respect to the phase of the external radio wave that the antenna ANT1 has received. Therefore, the phase shifter 925a advances the phase of the inputted signal by "γ=74 1+θ2+θ3" so as to correct the delay of the phase, so that the phase shift between the relaying radio wave transmitted from the antenna ANT2 and the external radio wave received by the antenna ANT1 is cancelled to be "0".

<Operation>

The operation of the repeater 1 in the first embodiment will be described.

Figure 5:
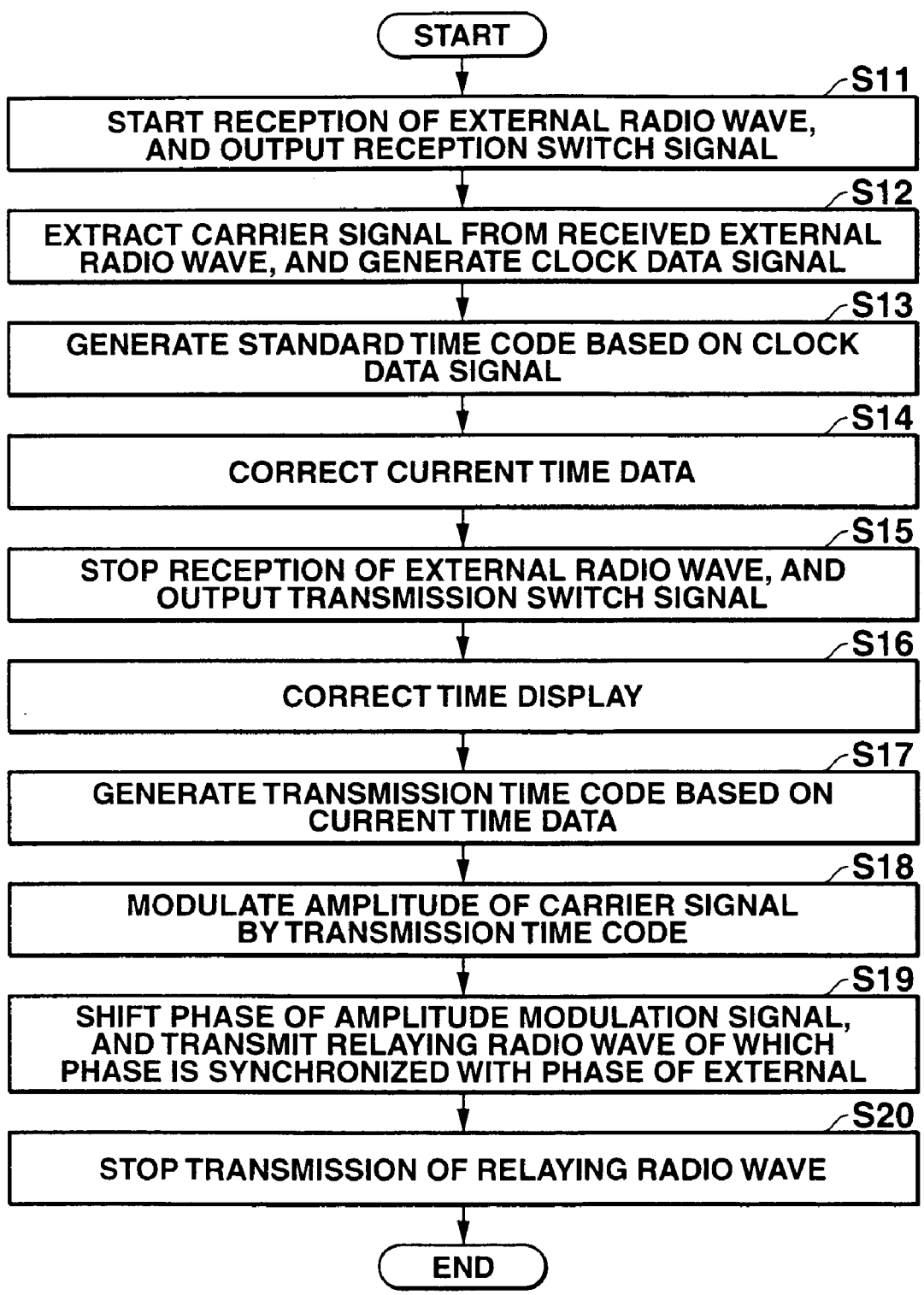
FIG. 5 is a diagram showing an operation of the repeater in the first embodiment of the present invention, in the form of a flowchart.

FIG. 5 is a diagram showing the operation of the repeater 1, in the form of a flowchart.

According to FIG. 5, first, the CPU 10 controls the reception control circuit 62A to start the reception of the external radio wave. In addition, the CPU 10 outputs a reception switch signal to the carrier extraction circuit 631a of the reception control circuit 62A (Step S11).

Accordingly, in the reception control circuit 62A, the signal a1 obtained by amplifying the external radio wave received by the antenna ANT1 is inputted to the detection circuit 629a. Further, the carrier signal b1 having the same frequency and the same phase as the signal a1 is generated by the carrier extraction circuit 631a. In addition, the clock data signal c1 is generated as the detection signal which has detected the signal a1, by the signal reproduction circuit 632a (Step S12).

After that, the standard time code based on the clock data signal c1 outputted from the reception control circuit 62A is generated by the time code generator 70 (Step S13). Further, the CPU 10 corrects the current time data of the time counter circuit 80 according to the generated standard time code (Step S14).

After that, the CPU 10 controls the reception control circuit 62A to stop the reception of the external radio wave. In addition, the CPU 10 outputs a transmission switch signal to the carrier extraction circuit 631a of the reception control circuit 62A (Step S15). Therefore, from then on, the carrier extraction circuit 631a keeps on generating the carrier signal b1 the phase of which is synchronized with that of the signal a1 which has been inputted just before the input of the transmission switch signal, that is, the signal a1 based on the external radio wave which has been received just before the end of the reception.

Further, the CPU 10 corrects the current time displayed on the display 30, based on the corrected current time data (Step S16). Accordingly, the CPU 10 generates the transmission time code d1 based on the corrected current time data (Step S17). After that, the CPU 10 controls the transmission control circuit 92A to start the transmission of the relaying radio wave.

Accordingly, in the transmission control circuit 92A, the modulator 923a generates the amplitude modulation signal obtained by modulating the amplitude of the carrier signal b1 outputted from the carrier extraction circuit 631a, by the transmission time code d1 generated by the CPU 10 (Step S18). After that, the phase of the amplitude modulation signal is shifted by the phase shifter 925a, and the relaying radio wave the phase of which is synchronized with that of the external radio wave is transmitted from the antenna ANT2 (Step S19).

Further, after the transmission of the relaying radio wave has been performed during a predetermined time, the CPU 10 controls the transmission control circuit 92A to stop the transmission of the relaying radio wave (Step S20).

As above, the reception of the external radio wave and the transmission of the relaying radio wave in the first embodiment are performed in the repeater 1.

<Action and Effect>

As above, according to the first embodiment, first, the reception processing of the external radio wave is executed in the reception control circuit 62A. Further, the carrier signal b1 having the same frequency and the same phase as the signal a1 obtained by amplifying the received external radio wave. In addition, the signal a1 is detected (synchronously detected) based on the carrier signal b1, and the clock data signal c1 is outputted. Next, the current time data is corrected according to the standard time code based on the clock data signal c1, and transmission time code d1 is generated, by the CPU 10. After that, the transmission processing of the relaying radio wave is executed in the transmission control circuit 92A. Further, in the transmission control circuit 92A, the amplitude modulation signal obtained by modulating the amplitude of the carrier signal b1 by the transmission time code d1, the phase of the signal b1 synchronized with that of the signal a1 based on the external radio wave which has been received just before the end of the reception, is generated. In addition, the phase of the amplitude modulation signal is shifted by the phase shifter 925b so that the phase of the relaying radio wave transmitted from the antenna ANT2 is synchronized with that of the external radio wave. That is, the relaying radio wave transmitted from the repeater 1 is the signal having the same frequency as the external radio wave. In addition, the relaying radio wave is the signal having the phase synchronized with the phase of the external radio wave, and no phase shift.

Incidentally, in the first embodiment, the transmission of the relaying radio wave is performed after the reception of the external radio wave. That is, the reception of the external radio wave and the transmission of the relaying radio wave are not performed at the same time. However, the reception of the external radio wave and the transmission of the relaying radio wave may be performed at the same time. In this case, the carrier extraction circuit 631a can be replaced by a carrier extraction circuit 631b shown in FIG. 6.

Figure 6:
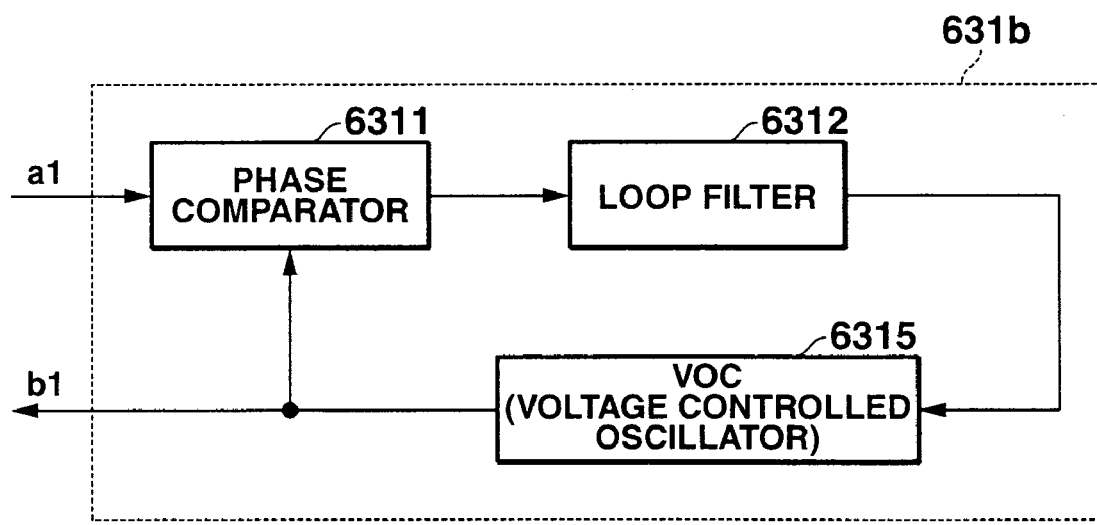
FIG. 6 is a diagram showing a modification of the carrier extraction circuit in the first embodiment of the present invention.

According to FIG. 6, the carrier extraction circuit 631b does not require the switch circuit 6313 and the voltage holding circuit 6314, and comprises the phase comparator 6311, the loop filter 6312 and the VCO 6315. Further, the signal outputted from the loop filter 6312 is always inputted to the VCO 6315, as the control voltage.

Figure 7:
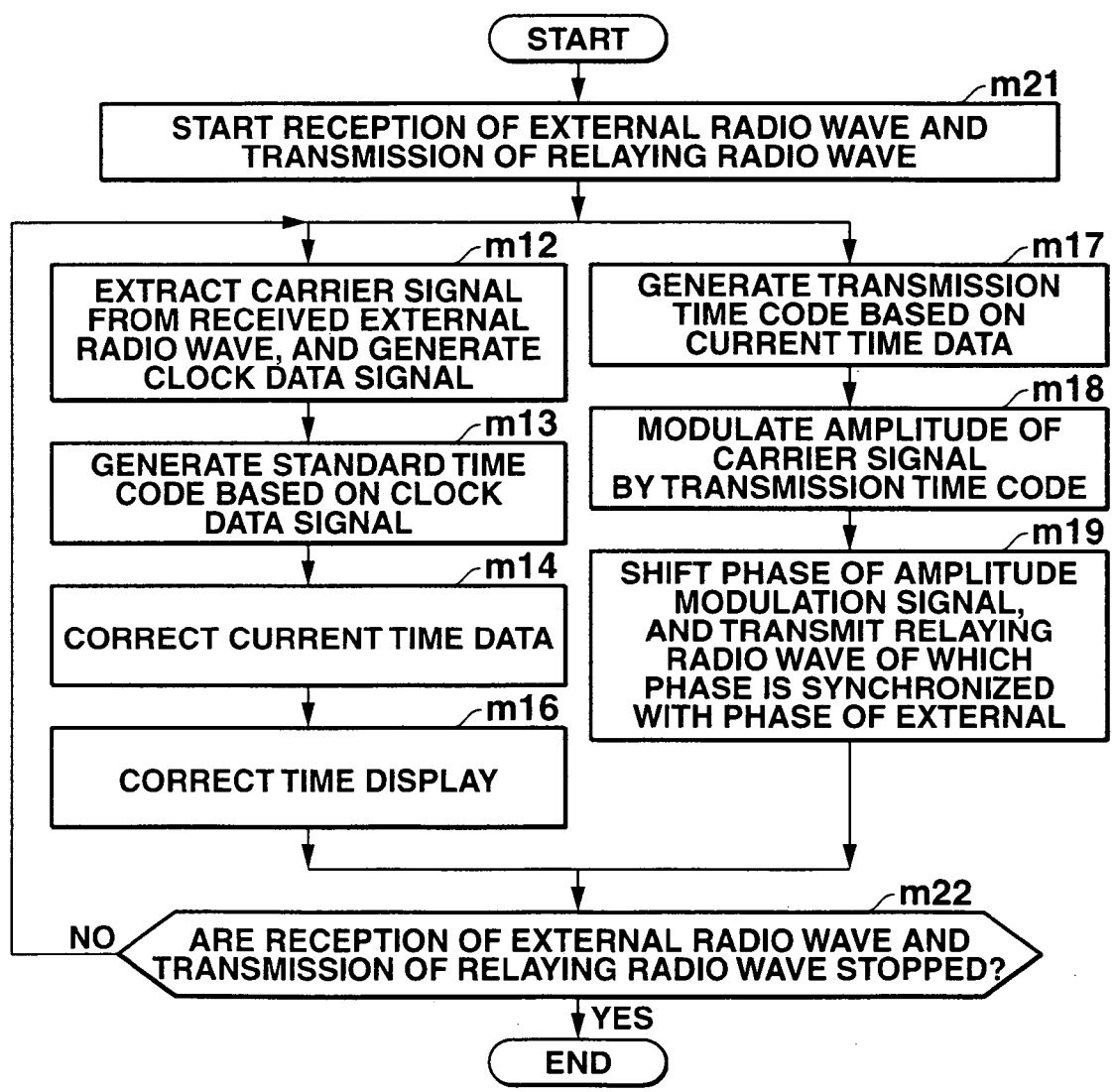
FIG. 7 is a diagram showing an operation of the repeater in the case where the reception of the external radio wave and the transmission of the relaying radio wave of the present invention are carried out at the same time, in the form of a flowchart.

A diagram showing the operation of the repeater 1 in the case where the reception of the external radio wave and the transmission of the relaying radio wave are performed at the same time, is shown in FIG. 7 in the form of a flowchart.

According to FIG. 7, the CPU 10 first controls the reception control circuit 62A to start the reception of the external radio wave. In addition, the CPU 10 controls the transmission control circuit 92A to start the transmission of the relaying radio wave (Step m21).

Accordingly, in the reception control circuit 62A, the signal a1 obtained by amplifying the external radio wave received by the antenna ANT1 is inputted to the detection circuit 629a. Further, the carrier signal b1 having the same frequency and the same phase as the signal a1 is generated by the carrier extraction circuit 631a. In addition, the clock data signal c1 is generated as the detection signal which has detected the signal a1, by the signal reproduction circuit 632a (Step m12).

After that, the standard time code based on the clock data signal c1 outputted from the reception control circuit 62A is generated by the time code generator 70 (Step m13). Further, the CPU 10 corrects the current time data of the time counter circuit 80 according to the generated standard time code (Step m14), and corrects the display of the time (Step m16).

On the other hand, the CPU 10 generates the transmission time code d1 based on the current time data counted by the time counter circuit 80 (Step m17). In the transmission control circuit 92A, the modulator 923a generates the amplitude modulation signal obtained by modulating the amplitude of the carrier signal b1 outputted from the carrier extraction circuit 631a, by the transmission time code d1 generated by the CPU 10 (Step m18). After that, the phase of the amplitude modulation signal is shifted by the phase shifter 925a, and the relaying radio wave the phase of which is synchronized with that of the external radio wave is transmitted from the antenna ANT2 (Step m19).

Further, after the reception of the external radio wave and the transmission of the relaying radio wave have been performed during a predetermined time (Step m22; Yes), the CPU 10 controls the reception control circuit 62A to stop the reception of the external radio wave. In addition, the CPU 10 controls the transmission control circuit 92A to stop the transmission of the relaying radio wave.

As above, the reception of the external radio wave and the transmission of the relaying radio wave are performed at the same time in the repeater 1.

Second Embodiment

Next, a second embodiment will be described.

In the second embodiment, the super-heterodyne system is used for a reception control circuit. Incidentally, in the second embodiment, by applying the same reference numbers to the same elements as the above-described first embodiment, detail descriptions thereof will be omitted.

<Configuration>

Figure 8:
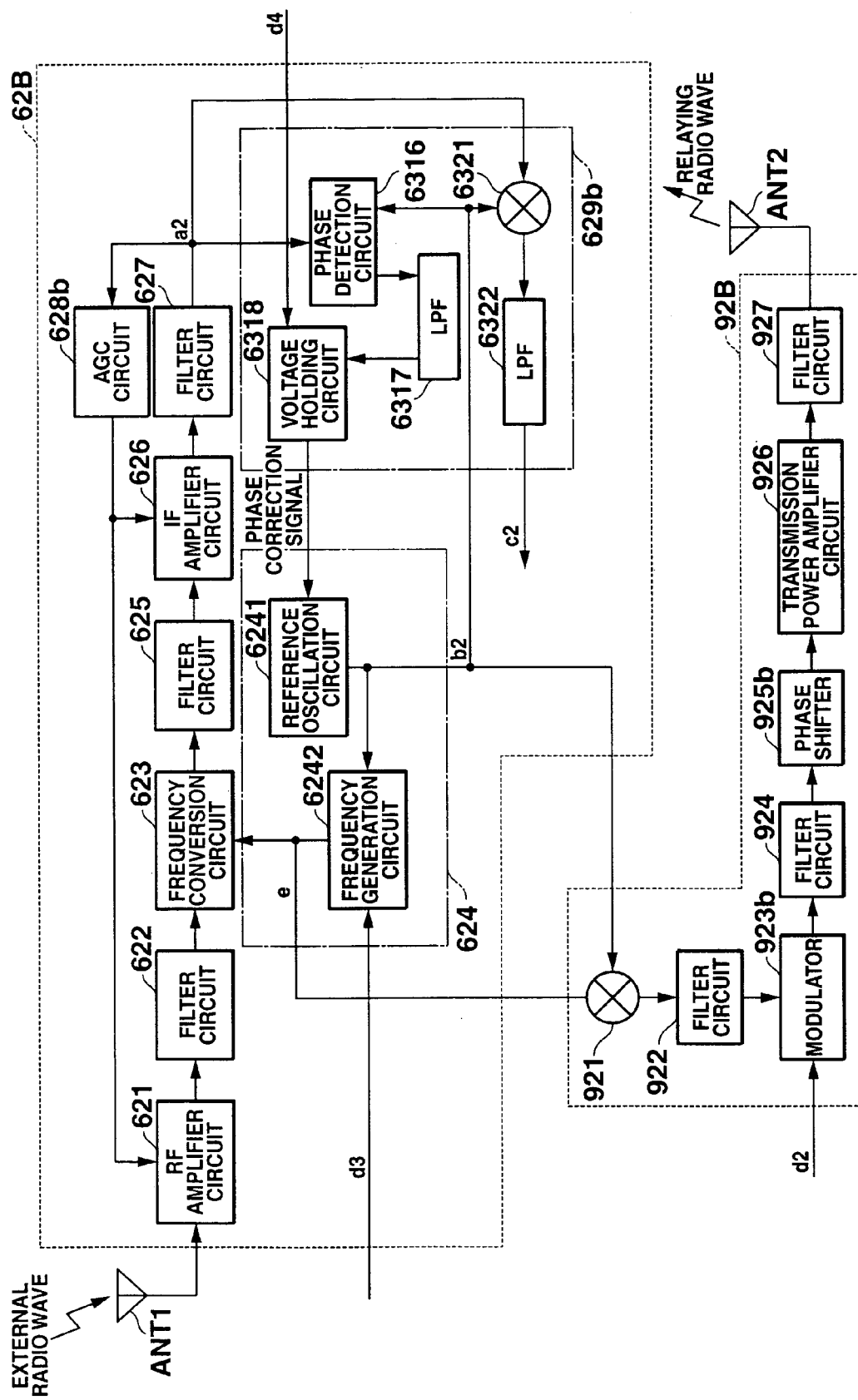
FIG. 8 is a diagram showing a circuit configuration of a repeater in the second embodiment of the present invention.

FIG. 8 is a block diagram showing the circuit configurations of a reception control circuit 62B and a transmission control circuit 92B of the repeater 1 in the second embodiment. In the second embodiment, a reception control circuit of the super-heterodyne system is used as the reception control circuit 62B.

According to FIG. 8, the reception control circuit 62B comprises an integrated circuit comprising a RF amplifier circuit 621, filter circuits 622, 625 and 627, a frequency conversion circuit 623, a frequency synthesizer circuit 624, an IF amplifier circuit 626, an AGC circuit 628b and a detection circuit 629b(i.e., the time information detection output section (circuit)), and an antenna ANT1.

The frequency conversion circuit 623 synthesizes the signal inputted from the filter circuit 622 with a local oscillation signal e inputted from the frequency synthesizer circuit 624. Further, the frequency conversion circuit 623 converts the synthesized signal into the signal having an intermediate frequency (referred to as an intermediate frequency signal), and outputs it.

The frequency synthesizer circuit 624 comprises a reference oscillation circuit 6241 and a frequency generation circuit 6242 (i.e., the oscillation signal generation section (circuit)), and generates the local oscillation signal e having a predetermined frequency.

The reference oscillation circuit 6241 comprises the VCO and the like. Further, the reference oscillation circuit 6241 generates a reference oscillation signal b2 the phase of which is corrected according to a phase correction signal as the control voltage inputted from the voltage holding circuit 6318, and outputs it.

The frequency generation circuit 6242 divides or multiplies the reference oscillation signal b2 inputted from the reference oscillation circuit 6241 according to frequency set data d3 inputted from the CPU 10. Further, the frequency generation circuit 6242 generates the local oscillation signal e, and outputs it. Incidentally, the frequency set data d3 is decided so as to generate the signal (intermediate frequency signal; for example, 50 kHz) having a predetermined intermediate frequency, based on the frequency (received frequency; for example, 40 kHz or 60 kHz) of the received external radio wave.

The filter circuit 625 comprises a band pass filter and the like. The filter circuit 625 outputs the intermediate frequency signal inputted from the frequency conversion circuit 623, while allowing the passage of frequency components of the signal within a predetermined range the center of which is the intermediate frequency, and blocking frequency components outside of the predetermined range.

The IF amplifier circuit 626 amplifies or damps the signal inputted from the filter circuit 625, according to the control signal inputted from the AGC circuit 628b, and outputs it.

The filter circuit 627 comprises a band pass filter and the like. The filter circuit 627 outputs the signal inputted from the IF amplifier circuit 626, as a signal a2, while allowing the passage of frequency components of the signal within a predetermined range the center of which is the intermediate frequency, and blocking frequency components outside of the predetermined range.

The AGC circuit 628b generates a gain control signal for adjusting the amplification degrees of the RF amplifier circuit 621 and the IF amplifier circuit 626, according to the strength of the signal a2 inputted from the filter circuit 627, and outputs it.

The detection circuit 629b comprises a phase detection circuit 6316, LPFs 6317 and 6322, a voltage holding circuit 6318, and a multiplier 6321. The detection circuit 629b detects the signal a2 inputted from the filter circuit 627, and outputs the detection signal as a clock data signal c2.

The phase detection circuit 6316 detects the phase of the signal a2 inputted from the filter circuit 627, based on the reference oscillation signal b2 inputted from the reference oscillation circuit 6241.

The LPF 6317 outputs the signal inputted from the phase detection circuit 6316, while allowing the passage of frequency components of the signal with in a predetermined lower range, and blocking frequency components outside of the lower range.

The voltage holding circuit 6318 comprises a condenser and the like. The voltage holding circuit 6314 holds the signal voltage level of the signal inputted from the LPF 6317, according to the transmission-reception switch signal d4 inputted from the CPU 10. To put it concretely, while the transmission-reception switch signal d4 is switched to the reception side, the voltage holding circuit 6318 outputs the signal voltage level of the signal inputted from the LPF 6317, as the phase correction signal. Further, while the transmission-reception switch signal d4 is switched to the transmission side, the voltage holding circuit 6318 keeps on holding the signal voltage level of the signal which has been inputted just before the input of the transmission-reception switch signal d4, and outputs it as the phase correction signal.

Therefore, while the transmission-reception switch signal d4 is switched to the reception side to receive the external radio wave, the reference oscillation circuit 6241 outputs the reference oscillation signal b2 the phase of which is synchronized with that of the signal a2 based on the received external radio wave. Further, while the transmission-reception switch signal d4 is switched to the transmission side not to receive the external radio wave, the reference oscillation circuit 6241 outputs the reference oscillation signal b2 the phase of which is synchronized with that of the signal a2 based on the external radio wave which has been inputted just before the end of the reception of the external radio wave.

The multiplier 6321 multiplies the reference oscillation signal b2 inputted from the reference oscillation circuit 6241 by the signal a2 inputted from the filter circuit 627 to synthesize them, and outputs the synthesized signal.

The LPF 6322 outputs the signal inputted from the multiplier 6321, as the clock data signal c2 which is the detection signal, while allowing the passage of lower frequency components of the signal within a predetermined range, and blocking frequency components outside of the predetermined range.

Further, the transmission control circuit 92B comprises an integrated circuit comprising a multiplier 921 (i.e., the multiplied signal generation section (circuit)), filter circuits 922 (i.e., the multiplied signal generation section (circuit)), 924 and 927, a modulator 923b(i.e., the transmission signal generation section (circuit)), a phase shifter 925b and a transmission power amplifier circuit 926, and an antenna ANT2.

The local oscillation signal e outputted from the frequency generation circuit 6242 and the reference oscillation signal b2 outputted from the reference oscillation circuit 6241 are inputted to the multiplier 921. Further, the multiplier 921 multiplies the inputted local oscillation signal e by the inputted reference oscillation signal b2 to synthesize them, and outputs the synthesized signal.

The filter circuit 922 comprises a band pass filter and the like. The filter circuit 922 outputs the signal inputted from the multiplier 921, while allowing the passage of frequency components of the signal within a predetermined range the center of which is the transmitted frequency, and blocking frequency components outside of the predetermined range.

The modulator 923b generates the amplitude modulation signal obtained by modulating the amplitude of the signal inputted from the filter circuit 922 as the carrier wave, by the transmission time code d2 inputted from the CPU 10.

The phase shifter 925b advances or delays the phase of the signal inputted from the filter circuit 924 by a predetermined amount to shift the phase, and outputs the signal. That is, the phase shifter 925b shifts the phase of the amplitude modulation signal so as to correct the phase delay of the relaying radio wave transmitted from the antenna ANT2 with respect to the external radio wave received by the antenna ANT1, similarly to the phase shifter 925a in the first embodiment.

<Operation>

Next, the operation of the repeater 1 in the second embodiment will be described.

The operation of the repeater 1 in the second embodiment is the same as the operation in the above-described first embodiment (refer to FIG. 5). That is, first, the CPU 10 controls the reception control circuit 62B to start the reception processing of the external radio wave. In addition, the CPU 10 outputs the reception switch signal to the voltage holding circuit 6318 of the reception control circuit 62B (Step S11).

Accordingly, in the reception control circuit 62B, the external radio wave received by the antenna ANT1 is synthesized with the local oscillation signal e outputted from the frequency generation circuit 6242, and converted into the intermediate frequency signal. And then, the signal a2 obtained by amplifying the intermediate frequency signal is inputted to the detection circuit 629b. Further, in the detection circuit 629b, the signal the phase of which is synchronized with that of the signal a2 by the phase correction signal outputted from the voltage holding circuit 6318 is outputted from the reference oscillation circuit 6241, as the carrier signal. In addition, the signal a2 is detected to extract the time data, and the detection signal comprising the extracted time data is generated as the time data signal c2 (Step S12).

After that, the standard time code based on the clock data signal c2 outputted from the reception control circuit 62B is generated by the time code generator 70 (Step S13). Further, the CPU 10 corrects the current time data of the time counter circuit 80 according to the generated standard time code (Step S14).

After that, the CPU 10 controls the reception control circuit 62B to stop the reception of the external radio wave. In addition, the CPU 10 outputs the transmission switch signal to the voltage holding circuit 6318 of the reception control circuit 62B (Step S15). Therefore, from then on, the reference oscillation circuit 6241 keeps on generating the reference oscillation signal b2 the phase of which is synchronized with that of the signal a2 just before the transmission switch signal has been inputted to the voltage holding circuit 6318, that is, the signal a2 based on the external radio wave which has been received just before the end of the reception.

Further, the CPU 10 corrects the current time displayed on the display 30, based on the corrected current time data (Step S16). Accordingly, the CPU 10 generates the transmission time code d2 based on the corrected current time data (Step S17). After that, the CPU 10 controls the transmission control circuit 92B to start the transmission of the relaying radio wave.

Accordingly, in the transmission control circuit 92B, the modulator 923b generates the amplitude modulation signal obtained by modulating the amplitude of the signal as the carrier signal, by the transmission time code d2 generated by the CPU 10, the signal obtained by synthesizing the local oscillation signal e with the reference oscillation signal b2 (Step S18). After that, the phase of the amplitude modulation signal is shifted by the phase shifter 925b. Thereby, the relaying radio wave the phase of which is synchronized with that of the external radio wave is transmitted from the antenna ANT2 (Step S19).

Further, after the transmission of the relaying radio wave has been performed during a predetermined time, the CPU 10 controls the transmission control circuit 92B to stop the transmission of the relaying radio wave (Step S20).

As above, the reception of the external radio wave and the transmission of the relaying radio wave in the second embodiment are performed in the repeater 1.

<Action and Effect>

As above, according to the second embodiment, first, the reception processing of the external radio wave is executed in the reception control circuit 62B. The received external radio wave is synthesized with the local oscillation signal e, and converted into the intermediate frequency signal. Further, the reference oscillation signal b2 the phase of which is synchronized with that of the signal a2 obtained by amplifying the intermediate frequency signal and making it pass through the filter. In addition, the signal a2 is detected based on the reference oscillation signal b2, and the clock data signal c2 is generated. Next, the current time is corrected according to the standard time code based on the clock data signal c2, and the transmission time code d2 is generated, by the CPU 10. After that, the transmission of the relaying radio wave is executed in the transmission control circuit 92B. Further, in the transmission control circuit 92B, the amplitude of the signal obtained by synthesizing the local oscillation signal e and the reference oscillation signal b2 the phase of which is synchronized with the signal a2 based on the external radio wave which has been received just before the end of the reception, is modulated as the carrier signal, by the transmission time code d2. Thereby, the amplitude modulation signal is generated. In addition, the phase of the amplitude modulation signal is shifted by the phase shifter 925b so that the phase of the relaying radio wave transmitted from the antenna ANT2 is synchronized with that of the external radio wave.

That is, the local oscillation signal e is generated by dividing or multiplying the reference oscillation signal b2. Therefore, the reference oscillation signal b2 and the local oscillation signal e are the signals the phases of which are synthesized with each other. Further, the signal which is the carrier wave used for the amplitude modulation, obtained by synthesizing the reference oscillation signal b2 and the local oscillation signal e, is the signal the phase of which is synchronized with the phases of the reference oscillation signal b2 and the local oscillation signal e. In addition, the signal has the same frequency as the received frequency of the external radio wave. Therefore, the relaying radio wave transmitted from the repeater 1 is the signal having the same frequency as the external radio wave. In addition, the relaying radio wave is the signal synchronized with the external radio wave, and having no phase shift with respect to the external radio wave.

Incidentally, in the second embodiment, the phase detection circuit 6316 performs the phase detection based on the reference oscillation signal b2. However, the detection circuit 6316 may perform the phase detection by using the signal obtained by multiplying or dividing the reference oscillation signal b2.

The application of the present invention is not limited to the above-described first and second embodiments, and of course can be changed without departing from the scope of the present invention.

What is claimed is:

1. A time information transmitter-receiver comprising:
a time count section for counting current time;
a first antenna;
a frequency conversion section for synthesizing a received signal received by the first antenna with an oscillation signal having a predetermined frequency, and converting the synthesized signal into an intermediate frequency signal;
a reference oscillation signal generation section for generating a signal having a phase synchronized with a phase of the intermediate frequency signal;
a time information detection output section for detecting the intermediate frequency signal based on the signal generated by the reference oscillation signal generation section, and outputting time information;
a transmission time generation section for correcting the current time counted by the time count section based on the time information outputted by the time information detection output section, and generating transmission time information from the corrected current time;
an oscillation signal generation section for generating the oscillation signal having the predetermined frequency, by multiplying or dividing the signal generated by the reference oscillation signal generation section;
a multiplied signal generation section for generating a multiplied signal having a same frequency as a frequency of the received signal by multiplying the signal generated by the reference oscillation signal generation section by the oscillation signal having the predetermined frequency;
a transmission signal generation section for generating a transmission signal obtained by modulating an amplitude of the multiplied signal, as a carrier wave having the same frequency as the frequency of the received signal, based on the transmission time information;
a phase shift section for shifting a phase of the transmission signal generated by the transmission signal generation section; and
a second antenna for transmitting the transmission signal the phase of which is shifted by the phase shift section,
wherein the phase shift section shifts the phase of the transmission signal so that the phase of the transmission signal coincides with a phase of the received signal when the second antenna transmits the transmission signal.

2. A time information transmitter-receiver comprising:
a time count section for counting current time;
a first antenna;
a frequency conversion section for synthesizing a received signal received by the first antenna with an oscillation signal having a predetermined frequency, and converting the synthesized signal into an intermediate frequency signal;
a reference oscillation signal generation section for generating a signal having a phase synchronized with a phase of the intermediate frequency signal;
a time information detection output section for detecting the intermediate frequency signal based on the signal generated by the reference oscillation signal generation section, and outputting time information;
a time correction section for correcting the current time counted by the time count section based on the time information outputted by the time information detection output section;
a transmission time generation section for generating transmission time information based on the current time counted by the time count section;
an oscillation signal generation section for generating the oscillation signal having the predetermined frequency by one of multiplying and dividing the signal generated by the reference oscillation signal generation section;
a multiplied signal generation section for generating a multiplied signal having a same frequency as a frequency of the received signal by multiplying the signal generated by the reference oscillation signal generation section by the oscillation signal having the predetermined frequency;

a transmission signal generation section for generating a transmission signal obtained by modulating an amplitude of the multiplied signal, as a carrier wave having the same frequency as the frequency of the received signal, based on the transmission time information;

a phase shift section for shifting a phase of the transmission signal generated by the transmission signal generation section;

a second antenna for transmitting the transmission signal the phase of which is shifted by the phase shift section; and a transmission-reception control section for controlling transmission of the transmission signal by the second antenna and reception of the received signal by the first antenna so as to perform the transmission and the reception at a same time, wherein the phase shift section shifts the phase of the transmission signal so that the phase of the transmission signal coincides with a phase of the received signal when the second antenna transmits the transmission signal.

3. A time information transmission-reception integrated circuit comprising:

a time count circuit for counting current time;

a frequency conversion circuit for synthesizing a received signal received by a first antenna with an oscillation signal having a predetermined frequency, and converting the synthesized signal into an intermediate frequency signal;

a reference oscillation signal generation circuit for generating a signal having a phase synchronized with a phase of the intermediate frequency signal;

a time information detection output circuit for detecting the intermediate frequency signal based on the signal generated by the reference oscillation signal generation circuit, and outputting time information;

a transmission time generation circuit for correcting the current time counted by the time count circuit based on the time information outputted by the time information detection output circuit, and generating transmission time information from the corrected current time;

an oscillation signal generation circuit for generating the oscillation signal having the predetermined frequency by one of multiplying and dividing the signal generated by the reference oscillation signal generation circuit;

a multiplied signal generation circuit for generating a multiplied signal having a same frequency as a frequency of the received signal by multiplying the signal generated by the reference oscillation signal generation circuit by the oscillation signal having the predetermined frequency;

a transmission signal generation circuit for generating a transmission signal obtained by modulating an amplitude of the multiplied signal, as a carrier wave having the same frequency as the frequency of the received signal, based on the transmission time information; and a phase shift circuit for shifting a phase of the transmission signal generated by the transmission signal generation circuit, wherein the phase shift circuit shifts the phase of the transmission signal so that the phase of the transmission signal coincides with a phase of the received signal when a second antenna transmits the transmission signal.

4. A time information transmission-reception integrated circuit comprising:

a time count circuit for counting current time;

a frequency conversion circuit for synthesizing a received signal received by a first antenna with an oscillation signal having a predetermined frequency, and converting the synthesized signal into an intermediate frequency signal;

a reference oscillation signal generation circuit for generating a signal having a phase synchronized with a phase of the intermediate frequency signal;

a time information detection output circuit for detecting the intermediate frequency signal based on the signal generated by the reference oscillation signal generation circuit, and outputting time information;

a time correction section for correcting the current time counted by the time count circuit based on the time information outputted by the time information detection output circuit;

a transmission time generation circuit for generating transmission time information based on the current time counted by the time count circuit;

an oscillation signal generation circuit for generating the oscillation signal having the predetermined frequency by one of multiplying and dividing the signal generated by the reference oscillation signal generation circuit;

a multiplied signal generation circuit for generating a multiplied signal having a same frequency as a frequency of the received signal by multiplying the signal generated by the reference oscillation signal generation circuit by the oscillation signal having the predetermined frequency;

a transmission signal generation circuit for generating a transmission signal obtained by modulating an amplitude of the multiplied signal, as a carrier wave having the same frequency as the frequency of the received signal, based on the transmission time information;

a phase shift circuit for shifting a phase of the transmission signal generated by the transmission signal generation circuit; and a transmission-reception control circuit for controlling transmission of the transmission signal the phase of which is shifted by the phase shift circuit and reception of the received signal so as to perform the transmission and the reception at a same time, wherein the phase shift circuit shifts the phase of the transmission signal so that the phase of the transmission signal coincides with a phase of the received signal when a second antenna transmits the transmission signal.

* * * * *